Patented Feb. 25, 1936

2,031,581

UNITED STATES PATENT OFFICE 2,031,581

SEXUAL HORMONE DERIVATIVES

Lorenz Ach, Mannheim-Waldhof, and Wilhelm Dirscherl, Heidelberg, Germany, assignors to Rare Chemicals, Inc., Nepera Park, N. Y., a corporation of New York No Drawing. Application November 21, 1933, Serial No. 699,092. Renewed December 14, 1934. In Germany November 26, 1932

7 Claims. (Cl. 260—106)

Our invention relates to new sexual hormone derivatives and more especially to derivatives of the female sexual hormone (follicle hormone) $C_{18}H_{22}O_2$ and to a method of preparing same.

It is an object of our invention to provide hormone derivatives which are more efficient than the hormone proper and other derivatives hitherto known.

One has tried to modify the action exerted by the female sexual hormone by converting the hormone into esters of higher molecular acids. In contradistinction to the acetic acid ester of the hormone, which has been found to possess substantially the same physiological properties as the hormone itself, the esters of the higher molecular acids show a more or less protracted action, i. e. their action will set in after a longer period of time, but will last longer than that of the free hormone.

We have now found that the very desirable protracted action is also obtained with certain hitherto unkown reaction products of the hormone, which are however favorably distinguished from all hormone compounds hitherto known in that their action not only sets in comparatively quickly, but is also more powerful. Thus, for instance the final products obtained according to the examples hereinafter described have been found to be about 2 to 2.5 times as efficient as the female sexual hormone (follicle hormone) $C_{18}H_{22}O_2$ proper and as the other hitherto known esters of this hormone.

The new compounds can be prepared by methods which would be expected to result in the formation of formic esters, starting either from the crystallized hormone or from oily preparations, more especially purified and concentrated preparations containing same.

In practising our invention we may for instance proceed as follows:—

Example 1

To a solution of 20 parts of the crystallized female sexual hormone $C_{18}H_{22}O_2$ in benzene are gradually added 50 parts pyridine chlorocarbonyl (see German Patent 109,933) suspended in benzene. The mixture is repeatedly shaken at room temperature and after the lapse of a few hours subjected to further treatment, being first shaken out with water, thereafter with acidulated water, thereupon with an alkali and finally with water. The compound thus formed is believed to be a chloroformic ester having the formula $Cl-CO-O-(C_{18}H_{21}O)$ and having a melting point of about 100° C. On driving off the benzene with steam, a new compound separates out under the form of well defined crystals, which are separated by filtration, dissolved in alcohol and precipitated from the solution with water. The product which contains a keto group and a hydroxyl group, and concerning whose constitution we are not yet certain, melts at about 242° C. under discoloration.

We wish to state expressly that the constitution attributed by us to the ester is the one which we at present believe to be correct and we do not wish to be tied down to it.

The reaction can be accelerated and high yields obtained by allowing the reagents more time for their reaction. If the mixture is allowed to stand during several days, a quantitative yield is obtained. Similarly by causing the reaction to proceed at an elevated temperature, for instance at about 70 to 75° C., the speed of reaction can be increased and high yields obtained.

Example 2

50 milligrams of the follicle hormone are dissolved in 11.5 ccms. benzene. To this solution is added a solution, freshly prepared, of 70 milligrams pyridine and 100 milligrams phosgene in .5 ccm. benzene and the mixture is heated during one hour to 70 to 75° C. in a sealed tube. The product of reaction which we believe to be the chloroformic ester, is subjected to the same treatment as described with reference to Example 1. The yield of the new product is almost quantitative. After repeated recrystallization the new reaction product of the hormone, melting at 242° C., is obtained.

If 100 milligrams pyridine and 80 milligrams phosgene are made to react with 50 milligrams of the hormone, the yield was found to be about 70%.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

We claim:—

1. The method of producing an ester of the female sexual hormone (follicle hormone) $C_{18}H_{22}O_2$, comprising acting on a product containing the hormone with a mixture of pyridine and phosgene.

2. The method of producing an ester of the female sexual hormone (follicle hormone) $C_{18}H_{22}O_2$, comprising acting on a product containing the hormone with pyridine chlorocarbonyl.

3. The method of producing an ester of the female sexual hormone (follicle hormone) $C_{18}H_{22}O_2$, comprising acting on the crystallized hormone with a mixture of pyridine and phosgene.

4. The method of producing an ester of the female sexual hormone (follicle hormone) $C_{18}H_{22}O_2$, comprising acting on the crystallized hormone with pyridine chlorocarbonyl.

5. As a new product, an ester of the female sexual hormone (follicle hormone) $C_{18}H_{22}O_2$, melting at about 100° C. this ester being believed to be the chloroformic ester having the formula $$Cl-CO-O-(C_{18}H_{21}O).$$

6. The method of producing a crystalline product having from about 2 to 2.5 times the activity of the female sexual hormone $C_{18}H_{22}O_2$, which comprises acting on the said female sexual hormone with pyridine and phosgene followed by treatment with steam and crystallization.

7. The method of producing a crystalline product having from about 2 to 2.5 times the activity of the female sexual hormone $C_{18}H_{22}O_2$, which comprises acting on the said female sexual hormone with pyridine chloro-carbonyl followed by treatment with steam and crystallization.

LORENZ ACH.
WILHELM DIRSCHERL.